(12) United States Patent
Oba

(10) Patent No.: US 11,132,564 B2
(45) Date of Patent: Sep. 28, 2021

(54) DISPLAY CONTROL DEVICE, DISPLAY CONTROL SYSTEM, DISPLAY CONTROL METHOD, AND DISPLAY CONTROL PROGRAM

(71) Applicant: JVCKENWOOD Corporation, Yokohama (JP)

(72) Inventor: Mitsugu Oba, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/711,347

(22) Filed: Dec. 11, 2019

(65) Prior Publication Data

US 2020/0117927 A1   Apr. 16, 2020

Related U.S. Application Data

(63) Continuation of application No. PCT/JP2018/010803, filed on Mar. 19, 2018.

(30) Foreign Application Priority Data

Jul. 25, 2017   (JP) .............................. JP2017-143234

(51) Int. Cl.
  *G06K 9/00* (2006.01)
  *H04N 7/18* (2006.01)
  (Continued)

(52) U.S. Cl.
  CPC ............ *G06K 9/00812* (2013.01); *B60R 1/02* (2013.01); *H04N 7/18* (2013.01); *B60R 2300/806* (2013.01); *B62D 15/027* (2013.01)

(58) Field of Classification Search
  CPC ........... G06K 9/00812; G06K 9/00798; G06K 9/4604; G06K 9/00791; B62D 15/027;
  (Continued)

(56) References Cited

U.S. PATENT DOCUMENTS 8,542,129 B2 * 9/2013 Taniguchi ............ B62D 15/028
  340/932.2
2006/0287826 A1 * 12/2006 Shimizu ............... B60Q 1/0023
  701/431

(Continued)

FOREIGN PATENT DOCUMENTS

JP   2008-162426 A   7/2008
JP   2008-296697 A   12/2008
(Continued)

*Primary Examiner* — Obafemi O Sosanya

(74) *Attorney, Agent, or Firm* — Procopio, Cory, Hargreaves & Savitch LLP

(57) ABSTRACT

A display control device includes a video data acquisition unit acquiring video data from a camera that captures a video in a moving direction of a vehicle, a parking line recognition unit recognizing a parking line being a line of a parking space from the video data, a center line generation unit generating a center line of the parking space from the recognized parking line, a vehicle moving line generation unit generating a vehicle moving line extending in the moving direction of the vehicle from a position corresponding to a center part along a width of the vehicle, a superimposed video generation unit generating superimposed data being video data where the center line and the vehicle moving line are superimposed on the video data, and a display control unit transmitting the superimposed data to a display unit to display a video related to the superimposed data on the display unit.

5 Claims, 14 Drawing Sheets

(51) Int. Cl.
*B60R 1/02* (2006.01)
*B62D 15/02* (2006.01)

(58) Field of Classification Search
CPC ............ B62D 15/0285; B62D 15/0275; B62D 15/028; H04N 7/18; H04N 7/183; B60R 2300/806; B60R 1/00; B60R 2300/305; B60R 2300/8086
See application file for complete search history.

(56) References Cited

U.S. PATENT DOCUMENTS

| | | |
|---|---|---|
| 2008/0158011 A1 | 7/2008 | Yamanaka |
| 2010/0066825 A1 | 3/2010 | Kuboyama et al. |
| 2016/0012725 A1* | 1/2016 | Lee .................. G08G 1/143 |
| | | 348/148 |
| 2016/0094807 A1* | 3/2016 | Fujio ................ B62D 15/0295 |
| | | 348/148 |

FOREIGN PATENT DOCUMENTS

| | | |
|---|---|---|
| JP | 2009-206615 A | 9/2009 |
| JP | 2011-211432 A | 10/2011 |
| JP | 2016-66322 A | 4/2016 |

* cited by examiner

DISPLAY CONTROL DEVICE, DISPLAY CONTROL SYSTEM, DISPLAY CONTROL METHOD, AND DISPLAY CONTROL PROGRAM

CROSS REFERENCE TO RELATED APPLICATION

The present application is a bypass continuation of PCT/JP2018/010803 filed on Mar. 19, 2018, which is based upon and claims the benefit of priority from Japanese Patent Application No. 2017-143234, filed on Jul. 25, 2017, the disclosure of which is incorporated herein in its entirety by reference.

BACKGROUND

The present invention relates to a display control device, a display control system, a display control method, and a display control program.

A technique that, when a vehicle is moving backward, superimposes a guide line indicating a predicted path of backward motion on a rearward video image captured using a rear camera mounted at the back of the vehicle and displays this video image on a display unit such as a monitor to easily and accurately guide the vehicle to a parking space has become popular recently.

For example, the vehicle-mounted imaging device disclosed in Japanese Unexamined Patent Application Publication No. 2011-211432 takes a video showing the back of a vehicle at the time of parking the vehicle, for example, and displays the video image showing the back of the vehicle on an in-vehicle monitor, and further superimposes a predicted path in the moving direction of the vehicle on this video image showing the back of the vehicle.

SUMMARY

FIG. 14 shows an example of the related art. A video image 40 shown in this example is a video image captured using a rear camera mounted at the back of a vehicle, on which a guide line 70 indicating a predicted path of the vehicle's backward motion is superimposed. A driver is moving a vehicle 10 to a parking space 33 that includes parking lines 30 and 31. The guide line 70 corresponds to the width of the vehicle 10 and is drawn along an intended path of the vehicle.

The parking line 30 and the guide line 70 overlap.

As described above, in the related art, a guide line superimposed on a rearward video image overlaps a parking line in some cases. In such cases, it is difficult for a driver to find out the parking line in the displayed video image. Thus, there are cases where it is difficult for a driver to grasp the positional relationship between a vehicle and a parking space.

The present embodiment has been accomplished to solve the above problems and an object of the present invention is thus to provide a display control device, a display control system, a display control method, and a display control program that support intuitive vehicle handling by reducing difficulty of visually determining a parking line displayed on a display unit.

A display control device according to an embodiment includes a video data acquisition unit configured to acquire video data from a camera that captures a video in a moving direction of a vehicle, a parking line recognition unit configured to recognize a parking line being a line of a parking space from the video data, a center line generation unit configured to generate a center line of the parking space based on the recognized parking line, vehicle moving line generation unit configured to generate a vehicle moving line extending in the moving direction of the vehicle from a position corresponding to a center part along a width of the vehicle, a superimposed video generation unit configured to generate superimposed data being video data where the center line and the vehicle moving line are superimposed on the video data, and a display control unit configured to transmit the superimposed data to a display unit so as to display a video related to the superimposed data on the display unit.

A display control method according to an embodiment includes acquiring video data from a camera that captures a video in a moving direction of a vehicle, recognizing a parking line being a line of a parking space from the video data, generating a center line of the parking space from the recognized parking line, generating a vehicle moving line extending in the moving direction of the vehicle from a position corresponding to a center part along a width of the vehicle, generating superimposed data being video data where the center line and the vehicle moving line are superimposed on the video data, and transmitting the superimposed data to a display unit so as to display a video related to the superimposed data on the display unit.

A display control program according to an embodiment causes a computer to execute acquiring video data from a camera that captures a video in a moving direction of a vehicle, recognizing a parking line being a line of a parking space from the video data, generating a center line of the parking space from the recognized parking line, generating a vehicle moving line extending in the moving direction of the vehicle from a position corresponding to a center part along a width of the vehicle, generating superimposed data being video data where the center line and the vehicle moving line are superimposed on the video data, and transmitting the superimposed data to a display unit so as to display a video related to the superimposed data on the display unit.

According to the embodiment, it is possible to provide a display control device, a display control system, a display control method, and a display control program that support intuitive vehicle handling by reducing difficulty of visually determining a parking line displayed on a display unit.

DETAILED DESCRIPTION

First Embodiment

Figure 1:
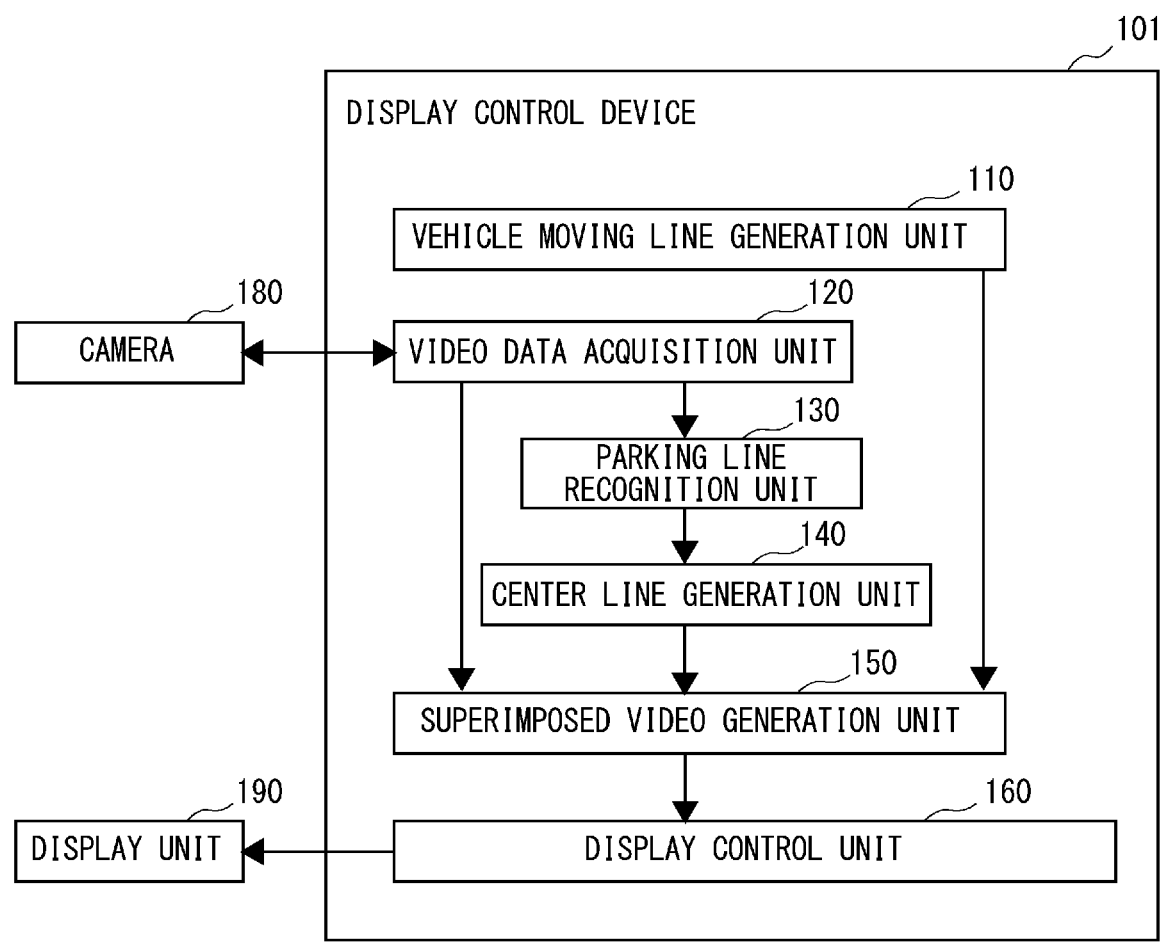
FIG. 1 is a functional block diagram of a display control system 100 according to a first embodiment.

A first embodiment of the present invention is described hereinafter with reference to the drawings. FIG. 1 is a functional block diagram of a display control system 100 according to the first embodiment. The following description and the drawings are appropriately shortened and simplified to clarify the explanation. In the figures, the identical reference symbols denote identical structural elements, and the redundant explanation thereof is omitted.

The display control system 100 is a system that, when a driver is moving a vehicle to a parking space or the like, superimposes a center line of the parking space and a vehicle moving line indicating the moving direction of the vehicle on a video image captured by a camera 180 that takes a video of a vehicle moving direction and displays this video image on a display unit 190. The display control system 100 may be implemented as one function of a car navigation system, a dashboard camera or the like which can be retrofitted to a vehicle, for example. Further, a display control device 101 may be implemented as one function of a system incorporated into a vehicle when assembling the vehicle in a factory, for example. Furthermore, the display control device 101 may be implemented by combining a system incorporated into a vehicle when assembling the vehicle in a factory and a device that can be retrofitted to a vehicle, for example. The display control system 100 includes the display control device 101 and at least one of the camera 180 and the display unit 190.

The display control device 101 acquires video data, which is data of a video captured by the camera 180, superimposes a vehicle moving line on this data and displays the data on the display unit 190. The display control device 101 may be implemented as a device in various forms such as a computer device that operates when a processor executes a program stored in a memory. The processor may be a micro processor, an MPU (Micro Processing Unit), or a CPU (Central Processing Unit), for example. The memory is a volatile memory or a nonvolatile memory, and it may be a combination of a volatile memory and a nonvolatile memory. The processor executes one or a plurality of programs including a group of instructions for causing a computer to perform processing according to an embodiment. The display control device 101 is connected with a CAN (Controller Area Network) or the like, which is an in-car network. Further, the display control device 101 is connected with the camera 180 and the display unit 190. The CAN or the like means that it may be an in-car network such as MOST (Media Oriented Systems Transport) or Ethernet (registered trademark), not limited to the CAN.

Further, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The display control device 101 is described hereinafter in detail. The display control device 101 includes a vehicle moving line generation unit 110, a video data acquisition unit 120, a parking line recognition unit 130, a center line generation unit 140, a superimposed video generation unit 150, and a display control unit 160.

The vehicle moving line generation unit 110 generates a vehicle moving line that extends in the moving direction of the vehicle from a center part along the width of a vehicle. The vehicle moving line is line information indicating the moving direction of the vehicle by being superimposed on video data captured by the camera 180. An example of a method of generating the vehicle moving line in the vehicle moving line generation unit 110 is schematically described below. The camera 180 is placed at the center part along the width of a vehicle so as to take a video in the moving direction of the vehicle. Thus, the vehicle moving line generation unit 110 generates the vehicle moving line where the initial setting is such that the camera 180 is placed at the center part along the width of a vehicle so as to take a video in the moving direction of the vehicle. The initial setting is a setting that displays a predetermined length of line extending vertically from the center part along the width in the underside of a screen of the display unit 190. The display control system 100 may have the function that allows a user to adjust the position, angle, length and the like of the vehicle moving line. The vehicle moving line generation unit 110 transmits information about the generated vehicle moving line to the superimposed video generation unit 150.

The video data acquisition unit 120 acquires the video data generated in the camera 180. The video data acquisition unit 120 acquires digital video data or analog video data from the camera 180. The video data acquisition unit transmits the video data to the superimposed video generation unit 150 as uncompressed digital video data or compressed video data in a format such as H.264 or H.265, for example. Further, the video data acquisition unit 120 may generate video data in a compressed video format such as MPEG (Moving Picture Experts Group) 2-TS (Transport Stream) or AVI (Audio Video Interleave). The video data acquisition unit 120 transmits the video data to the superimposed video generation unit 150. Note that it is arbitrary in which block compression is to be performed or whether data is to be compressed or uncompressed, and compressed video data may be acquired from a camera unit, for example.

The parking line recognition unit 130 recognizes parking lines displayed in a parking space from the video data transmitted from the video data acquisition unit 120. A specific example of a technique of recognizing parking lines in the parking line recognition unit 130 is described below. The parking line recognition unit 130 calculates a luminance gradient of each pixel of the video data, for example. The parking line recognition unit 130 then recognizes parking lines by using a predetermined technique such as edge detection. A technique of calculating a luminance gradient of each pixel of video data and recognizing a target object is a known technique. Thus, the detailed description thereof is omitted. The parking line recognition unit 130 recognizes parking lines and thereby generates information about whether parking lines exist in the video data and the positions of parking lines in the video data. The parking line recognition unit 130 transmits the generated information to the center line generation unit 140. Further, when the parking line recognition unit 130 does not recognize any parking line, it may transmit information indicating that no parking line is contained in the video data to the center line generation unit 140.

The center line generation unit 140 generates a center line of the parking space based on the information transmitted from the parking line recognition unit 130. The center line of the parking space is a line extending in parallel to the middle of two parallel parking lines drawn on the left and right sides of a vehicle parked position among the parking lines drawn in the parking space. The center line generation unit 140 transmits information about the generated center line to the superimposed video generation unit 150.

The superimposed video generation unit 150 receives each of the information transmitted from the vehicle moving line generation unit 110, the video data transmitted from the video data acquisition unit 120, and the information transmitted from the parking line recognition unit 130. The superimposed video generation unit 150 then generates video data on which the vehicle moving line and the center line are superimposed. The video data generated by the superimposed video generation unit 150 is referred to hereinafter as superimposed data. The superimposed video generation unit 150 transmits the generated superimposed data to the display control unit 160.

The display control unit 160 receives the superimposed data transmitted from the superimposed video generation unit 150. The display control unit 160 transmits the received superimposed data to the display unit 190. The display control unit 160 may transmit the superimposed data to the display unit 190 or stop transmitting the superimposed data in response to an instruction from a display instruction unit, which is not shown, for example.

The display control unit 160 may process the received superimposed data so as to change the viewing angle of a video image to be displayed on the display unit. Further, the display control unit 160 may process the received superimposed data so as to perform distortion correction of a video image to be displayed on the display unit. Furthermore, the display control unit 160 may process the received superimposed data so as to change a video image to be displayed on the display unit to a video image viewed from the top of the vehicle. The display control unit 160 may process the received superimposed data so as to change a video image to be displayed on the display unit in a way not limited the above.

The display control device 101 may include an acquisition unit, which is not shown, and acquire vehicle motion information by being connected with a CAN or the like or receiving information from a sensor or the like. In this case, the display control unit 160 may transmit the superimposed data to the display unit 190 or stop transmitting the superimposed data in accordance with the vehicle motion information acquired by the acquisition unit, which is not shown. Further, the display control device 101 may include an acquisition unit, which is not shown, and acquire a user instruction. In this case, the display control unit 160 may transmit the superimposed data to the display unit 190 or stop transmitting the superimposed data in accordance with the information acquired by the acquisition unit, which is not shown.

The camera 180 generates video data that shows a frontward or rearward video of a vehicle. The camera 180 may be placed on the front of a vehicle. The camera 180 may be placed on the back of a vehicle. Further, the camera 180 may be placed on each of the front of a vehicle and the back of the vehicle. The camera 180 transmits the generated video data to the video data acquisition unit 120 in the display control device 101.

The display unit 190 displays the video data or superimposed data received from the display control unit 160 in the display control device 101. The display unit 190 is a display device such as a liquid crystal display device, an organic EL (organic electro-luminescence) display device, or a head-up display, for example. The display unit 190 is placed at a position that can be viewed by a driver while handling a vehicle. The position that can be viewed by a driver while handling a vehicle is a position on a center console, on a dashboard, on a meter panel, on a rear-view mirror, near a steering wheel, on a windshield or the like, for example.

Figure 2:
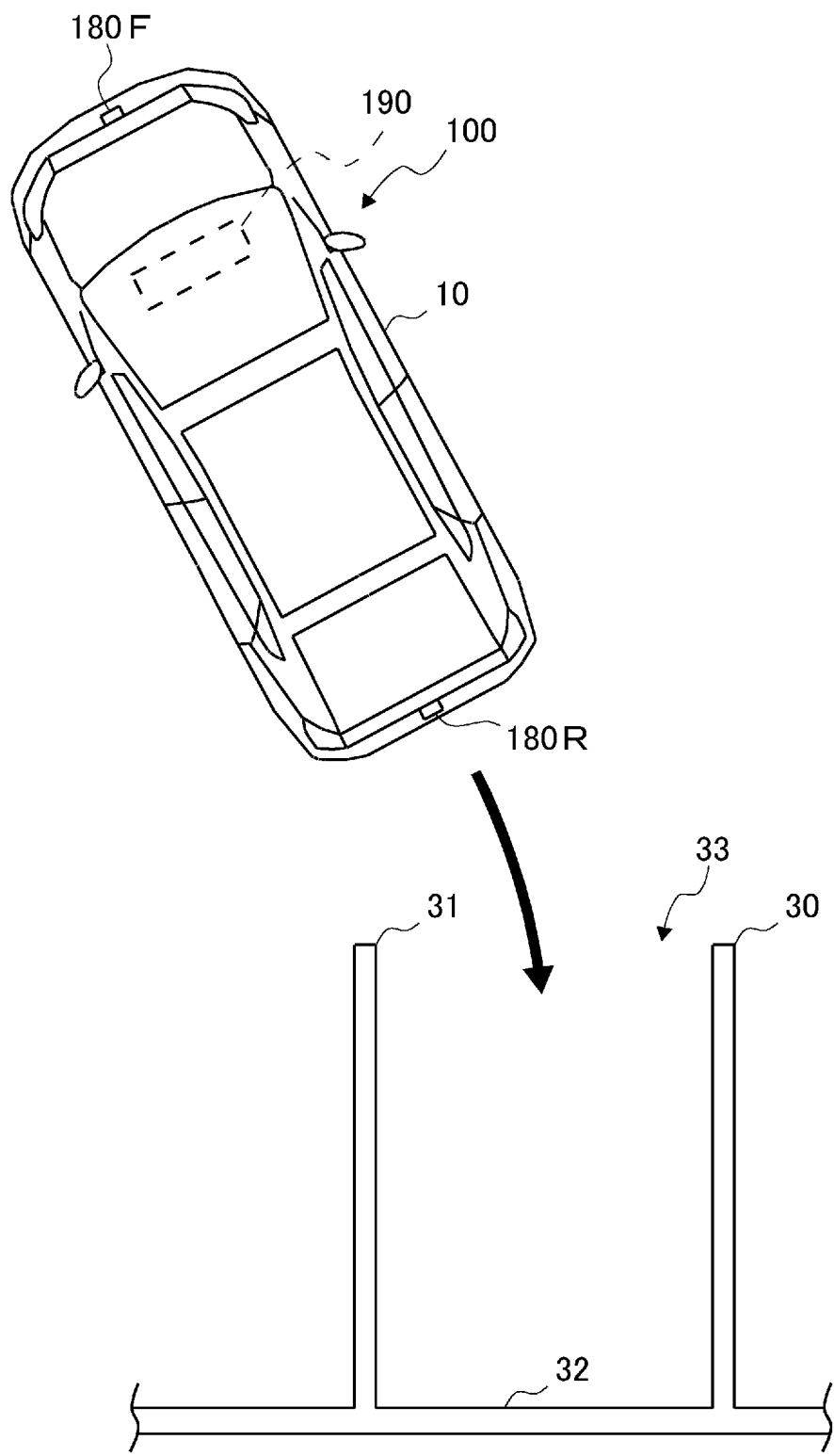
FIG. 2 is a top view showing an example of a state where a vehicle 10 on which the display control system 100 is mounted is moving to a parking space.

A vehicle on which the display control system 100 is mounted is described hereinafter with reference to FIG. 2. FIG. 2 is a top view showing an example of a state where a vehicle 10 on which the display control system 100 is mounted is moving to a parking space. The vehicle 10 includes the display control device 101 at an arbitrary position. The vehicle 10 also includes a forward camera 180F and a rearward camera 180R. The vehicle 10 further includes the display unit 190 at a position that can be viewed by a driver while handling the vehicle. In FIG. 2, the vehicle 10 is moving backward toward a parking space 33. The parking space 33 includes parking lines 30 to 32. The driver is trying to move the vehicle 10 to a position surrounded by the parking lines 30 to 32. In this case, the display control system 100 acquires data of a video captured by the rearward camera 180R.

Figure 3:
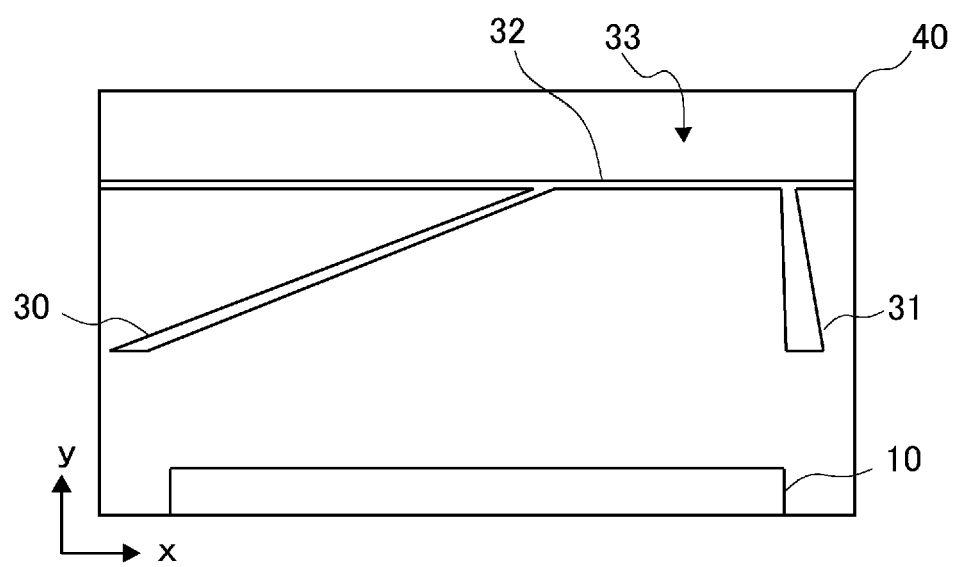
FIG. 3 is a view showing an example of a video image where video data captured using a camera in the vehicle 10 is displayed on a display unit 190.

The video data captured by the camera of the vehicle 10 is described hereinafter. FIG. 3 is a view showing an example of a video image where video data captured by a camera in the vehicle 10 is displayed on the display unit 190. A video image 40 contains a part of the vehicle 10 and the parking space 33. The parking space 33 contains the parking lines 30 to 32. The lower side of the video image 40 shows a position closer to the vehicle 10, and the upper side of the video image 40 shows a position farther from the vehicle 10.

FIG. 3 contains x-y coordinates. In FIG. 3, the x-coordinate indicates the horizontal direction of the video image 40. The rightward direction of FIG. 3 is the positive direction of the x-axis. In FIG. 3, the y-coordinate indicates the vertical direction of the video image 40. The upward direction of FIG. 3 is the positive direction of the y-axis. The x-y coordinates in FIG. 3 are shown for the convenience of explaining the positional relationship of elements. The x-y coordinates in the subsequent figures are shown for the same purpose as the x-y coordinates in FIG. 3.

Figure 4:
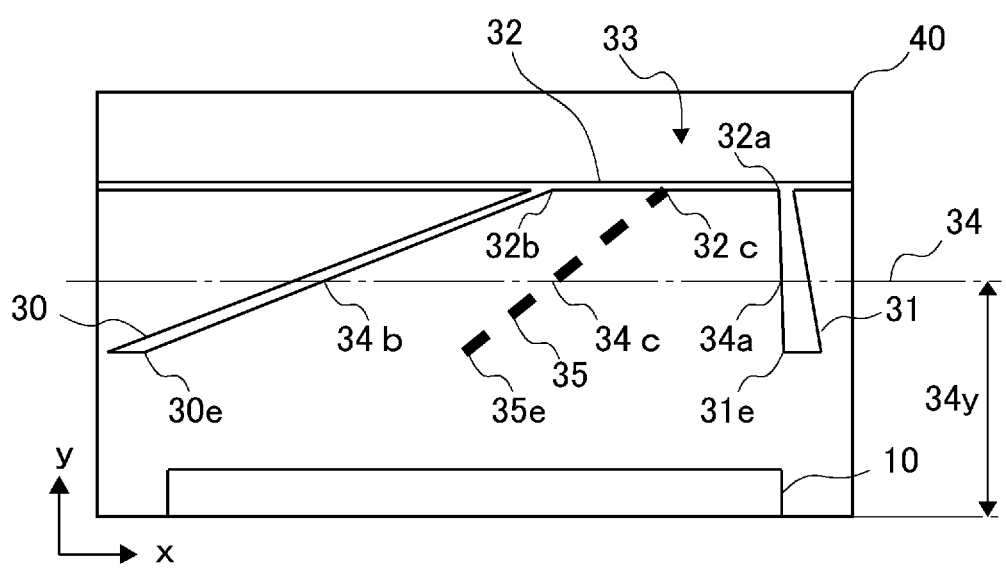
FIG. 4 is a view showing an example of a video image where a center line is superimposed on video data in the display control system 100 according to the first embodiment.

A specific example of a technique of generating a center line in the center line generation unit 140 is described hereinafter with reference to FIG. 4. FIG. 4 is a view showing an example of a video image where a center line is superimposed on video data in the display control system 100 according to the first embodiment. In FIG. 4, the video image 40 contains a center line 35 in addition to the video data shown in FIG. 3.

The center line generation unit 140 calculates two points contained in the center line 35 in order to generate the center line 35. First, a specific example of a technique of calculating one of the two points contained in the center line 35 is described. The center line generation unit 140 recognizes the parking lines 30 to 32 from the information transmitted from the parking line recognition unit 130. The center line generation unit 140 calculates an intersection point 32b between the parking line 30 and the parking line 32. The position of the intersection point 32b is represented by the x-y coordinates $(x_{32b}, y_{32b})$. Further, the center line generation unit 140 calculates an intersection point 32a between the parking line 31 and the parking line 32. The position of the intersection point 32a is represented by the x-y coordinates $(x_{32a}, y_{32a})$. Then, the center line generation unit 140 calculates a midpoint 32c between the intersection point 32a and the intersection point 32b. The midpoint 32c is represented by the x-y coordinates $((x_{32b}+x_{32a})/2, (y_{32b}+y_{32a})/2)$.

A specific example of a technique of calculating the other one of the two points contained in the center line 35 is described next. The center line generation unit 140 sets a virtual line 34 that is parallel to the x-axis at a position at a distance 34y from the lower end of the video image 40 in the y-direction. The virtual line 34 is used for the convenience of calculation to generate the center line 35, and it is not necessarily actually displayed on the video image 40. Further, the distance 34y is a predetermined arbitrary distance. The center line generation unit 140 calculates an intersection point 34b between the parking line 30 and the virtual line 34. The position of the intersection point 34b is represented by the x-y coordinates $(x_{34b}, y_{34b})$. Further, the center line generation unit 140 calculates an intersection point 34a between the parking line 31 and the virtual line 34. The position of the intersection point 34a is represented by the x-y coordinates $(x_{34a}, y_{34a})$. Then, the center line generation unit 140 calculates a midpoint 34c between the intersection point 34a and the intersection point 34b. The midpoint 34c is represented by the x-y coordinates $((x_{34b}+x_{34a})/2, (y_{34b}+y_{34a})/2)$.

The center line generation unit 140 generates the center line 35, which is a line connecting the calculated midpoint 32c and midpoint 34c. The center line 35 begins at the midpoint 32c and extends to an end point 35e. The center line 35 is a line that is virtually parallel to the parking line 30 and the parking line 31. Being virtually parallel means that a line displayed on the video image 40 is parallel if it were exist in the actual scenery captured. The end point 35e can be set on a line connecting an end point 30e of the parking line 30 and an end point 31e of the parking line 31, for example. Note that, although the center line 35 is indicated by a dashed line in FIG. 4, any line type may be used. The width and color of the center line 35 may be selected arbitrarily so that the line is easily visible to a user. For example, the center line is not necessarily equally bold, and its width may vary from the midpoint 32c to the end point 35e.

Figure 5:
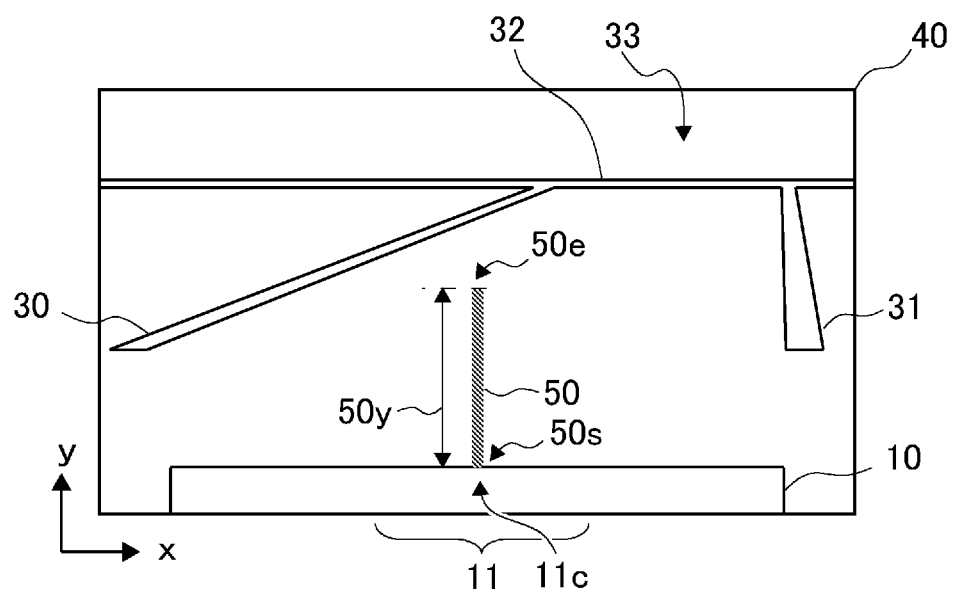
FIG. 5 is a view showing an example of a video image where a vehicle moving line is superimposed on video data in the display control system 100 according to the first embodiment.

A vehicle moving line is described hereinafter with reference to FIG. 5. FIG. 5 is a view showing an example of a video image where a vehicle moving line is superimposed on video data in the display control system 100 according to the first embodiment. The video image 40 in FIG. 5 contains a vehicle moving line 50 in addition to the video image described in FIG. 3. The vehicle moving line 50 connects a start point 50s and an end point 50e by a straight line. The vehicle moving line 50 coincides with the direction when a vehicle moves in a straight line. Specifically, the vehicle moving line 50 is a line that extends in the moving direction of the vehicle 10 from a center part 11 of the width of the vehicle 10. The vehicle moving line 50 extends perpendicularly from the start point 50s. The start point 50s is contained in the center part 11 of the vehicle 10.

The center part 11 is a region that occupies about one-third of the width of the vehicle 10 displayed on the video image 40. The start point 50s may coincide with a center point 11c in the center part 11.

The end point 50e may indicate a position where the actual distance from the vehicle 10 corresponds to a predetermined value. In the video image 40, a length 50y in the y-axis direction from the start point 50s to the end point 50e corresponds to a distance of 3 meters, for example, from the center part 11 of the vehicle 10. In this case, the length 50y up to the end point 50e in the y-axis direction can be fixed.

The vehicle moving line 50 is not necessarily a solid line as shown in FIG. 4, and it may be a dashed line or a dotted line. The vehicle moving line 50 is not necessarily equally bold, and its width may vary from the start point 50s to the end point 50e.

Note that, in some cases, the vehicle moving line 50 does not coincide with the moving direction of the vehicle 10 depending on the mounted state of the camera 180 or the like. In such a case, the vehicle moving line generation unit 110 may have the function that adjusts the position, angle and the like of the vehicle moving line 50 by user operation.

Figure 6A:
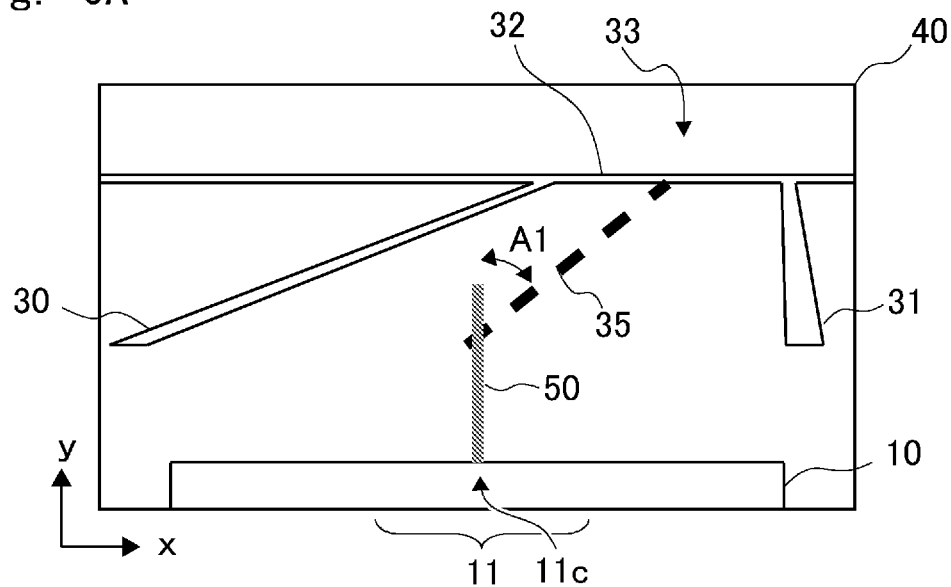
FIG. 6A is a view showing an example of a video image where a center line and a vehicle moving line are superimposed on video data in the display control system 100 according to the first embodiment.
Figure 6B:
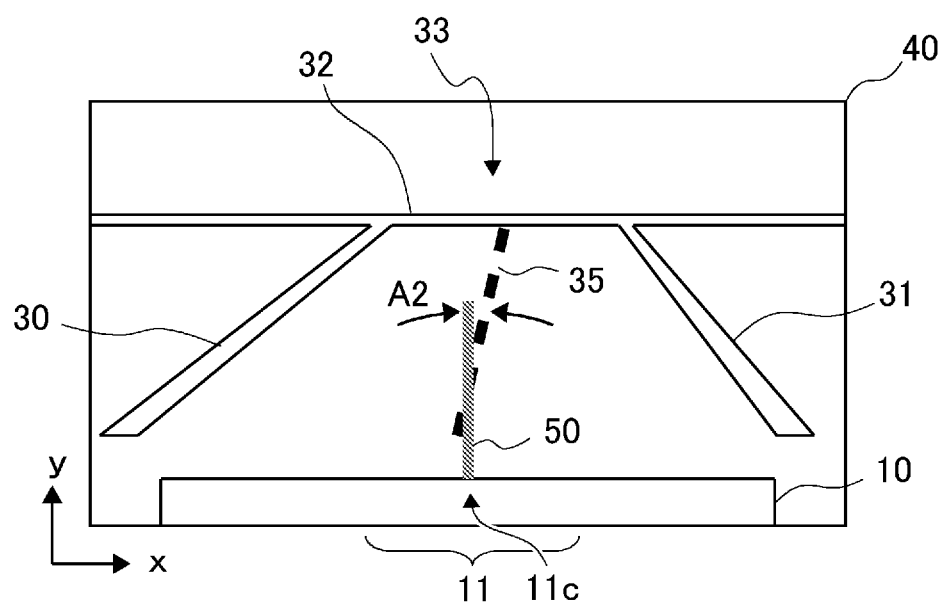
FIG. 6B is a view showing an example of a video image where a center line and a vehicle moving line are superimposed on video data in the display control system 100 according to the first embodiment.

An example of a video image on which a center line and a vehicle moving line are superimposed is described hereinafter with reference to FIGS. 6A and 6B. FIGS. 6A and 6B are views showing an example of a video image where a center line and a vehicle moving line are superimposed on video data in the display control system 100 according to the first embodiment. In other words, FIGS. 6A and 6B show superimposed data transmitted from the display control unit 160 to the display unit 190. The video image 40 of FIG. 6A and the video image 40 of FIG. 6B are video images showing the parking space 33 captured by the camera 180. Note that, however, the video image 40 of FIG. 6B shows the state where the vehicle comes closer to the parking space 33 compared with the video image 40 of FIG. 6A.

In FIG. 6A, the vehicle 10 and the parking space 33 are at a certain distance from each other. Further, the vehicle 10 and the parking space 33 are at a certain angle from each other. The lower side of the video image 40 shows a position closer to the vehicle 10, and the upper side of the video image 40 shows a position farther from the vehicle 10. In the video image 40, an object located nearby is displayed relatively larger than an object located far away. Therefore, despite that the parking line 30 and the parking line 31 are parallel in reality, they are displayed at a larger distance therebetween on the lower side of the image and displayed at a smaller distance therebetween on the upper side of the image. In this manner, an object displayed in an area close to the left or right edge of the video image 40 is displayed at an angle different from the actual angle with the vehicle 10. Thus, it is difficult for a user to intuitively grasp an angle between the parking line 30 or the parking line 31 and the vehicle 10.

On the other hand, an object displayed in a center part in the horizontal direction of the video image 40 is displayed at an angle close to the actual angle with the vehicle 10. In the case of FIG. 6A, an angle A1 between the center line 35 and the vehicle moving line 50 is close to the actual angle between the vehicle 10 and the parking space 33. Therefore, a user can control a steering wheel by using the angle A1 as a guide.

FIG. 6B shows a state where the vehicle 10 has come closer to the parking space 33 compared with the example shown in FIG. 6A. In FIG. 6B, an angle A2 between the center line 35 and the vehicle moving line 50 is smaller than the angle A1 shown in FIG. 6A. Thus, the user can control a steering wheel by using the angle A2 as a guide. Further, the user can handle the vehicle 10 in such a way that the vehicle moving line 50 and the center line 35 overlap.

Figure 7:
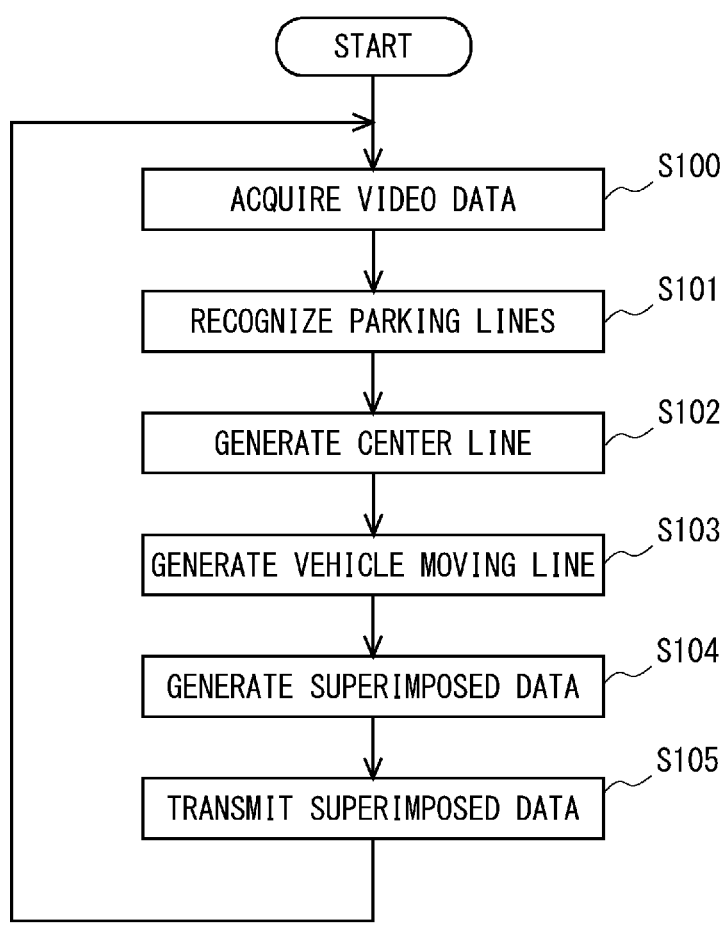
FIG. 7 is a view showing a flowchart in a display control device 101 according to the first embodiment.

A process of the display control device 101 according to the first embodiment is described hereinafter with reference to FIG. 7. FIG. 7 is a view showing a flowchart in the display control device 101 according to this embodiment.

First, the video data acquisition unit 120 acquires video data generated by the camera 180 (Step S100). The video data acquisition unit 120 then transmits the acquired video data to the parking line recognition unit 130 and the superimposed video generation unit 150.

Next, the parking line recognition unit 130 recognizes parking lines from the video data transmitted from the video data acquisition unit 120, and transmits information about the recognized parking lines to the center line generation unit 140 (Step S101). To be specific, with reference to the examples of FIGS. 6A and 6B, the parking line recognition unit 130 recognizes the positions of the parking lines 30 to 32 by performing image processing.

Then, the center line generation unit 140 generates the center line 35 from the information transmitted from the parking line recognition unit 130, and transmits information about the generated center line 35 to the superimposed video generation unit 150 (Step S102). A method of generating the center line 35 is described earlier with reference to FIG. 4, for example.

Then, the vehicle moving line generation unit 110 generates the vehicle moving line, and transmits information about the generated vehicle moving line to the superimposed video generation unit 150 (Step S103). A method of generating the vehicle moving line is described earlier with reference to FIG. 5, for example. After that, the superimposed video generation unit 150 generates superimposed data, which is video data where the information about the center line transmitted from the center line generation unit 140 and the information about the vehicle moving line transmitted from the vehicle moving line generation unit 110 are superimposed on the video data transmitted from the video data acquisition unit 120, and transmits this superimposed data to the display control unit 160 (Step S104).

Then, the display control unit 160 transmits the superimposed data transmitted from the superimposed video generation unit 150 to the display unit 190, and displays the data thereon (Step S105). After the display control unit 160 ends the transmission of the superimposed data, the process returns to Step S100, and the display control device 101 performs the acquisition of video data.

Note that Step S103 may be performed in parallel with Steps S100 to S102, or Step S103 may be performed before Step S102.

In this configuration, the display control system 100 according to the first embodiment reduces the possibility that a parking line and a vehicle moving line overlap in the y-axis direction of the video image 40 when a driver moves a vehicle to a parking space. Thus, the display control system 100 according to the first embodiment can reduce difficulty of visually determining a parking line. Further, it is possible to provide the display control system that supports intuitive vehicle handling by intending to make the vehicle moving line coincide with the center line 35.

Second Embodiment

A second embodiment is described hereinafter. A display control system 200 according to the second embodiment is different from the display control system 100 according to the first embodiment in the way of displaying a center line. Further, the display control system 200 according to the second embodiment is different from the first embodiment in that a vehicle moving line can be in synchronization with the motion of a vehicle.

Figure 8:
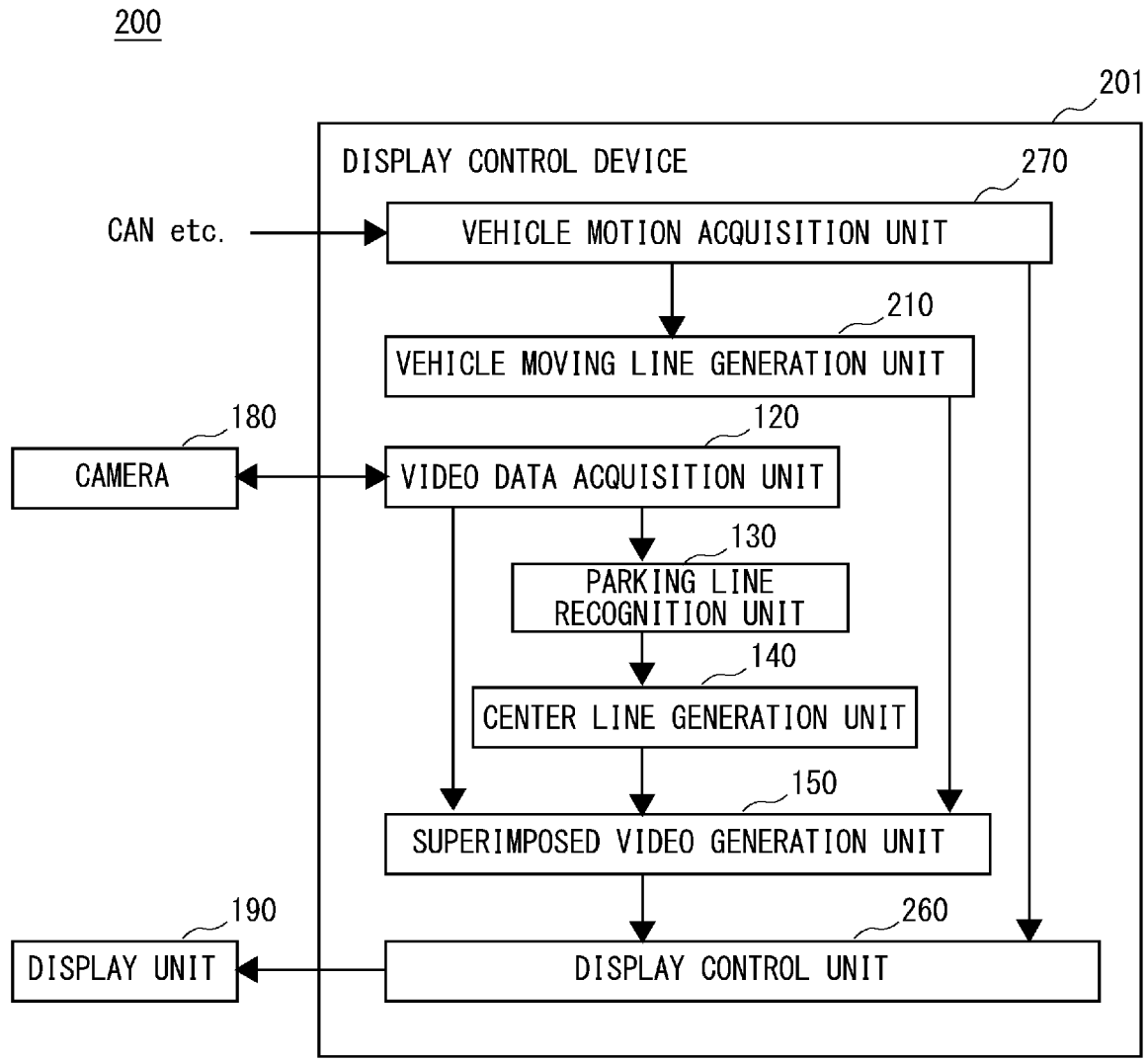
FIG. 8 is a functional block diagram of a display control system 200 according to a second embodiment.

The configuration of the display control system 200 according to the second embodiment is described hereinafter with reference to FIG. 8. FIG. 8 is a functional block diagram of the display control system 200 according to the second embodiment. The display control system 200 according to the second embodiment is different from the display control system 100 according to the first embodiment in that a display control device 201 includes a vehicle motion acquisition unit 270. Elements different from those of the first embodiment are described hereinafter in detail.

The display control device 201 includes the vehicle motion acquisition unit 270, a vehicle moving line generation unit 210, a video data acquisition unit 120, a parking line recognition unit 130, a center line generation unit 140, a superimposed video generation unit 150, and a display control unit 260. The vehicle motion acquisition unit 270 receives motion information, which is information about the motion of a vehicle from a CAN or the like, which is an in-car network. The motion information is information containing some or all of information indicating to which range the transmission of a vehicle is set, information indicating the steering angle of a vehicle, and information indicating the traveling speed of a vehicle. Specifically, the vehicle motion acquisition unit 270 acquires a predetermined signal among signals transmitted from a CAN or the like, and transmits this signal to the vehicle moving line generation unit 210 or the display control unit 260. By receiving the motion information, the vehicle motion acquisition unit 270 can acquire that the transmission is set to the reverse range, for example. Further, the vehicle motion acquisition unit 270 can acquire that the transmission is set to the low-speed driving range, for example.

Furthermore, the vehicle motion acquisition unit 270 can acquire information indicating the steering angle of a vehicle and monitor the angle of the steering wheel of the vehicle. The vehicle motion acquisition unit 270 can acquire information indicating the traveling speed of a vehicle and monitor the traveling speed of the vehicle.

The vehicle moving line generation unit 210 receives the motion information transmitted from the vehicle motion acquisition unit 270. Then, the vehicle moving line generation unit 210 generates a vehicle moving line based on the motion information transmitted from the vehicle motion acquisition unit 270. In the second embodiment, the vehicle moving line is line information indicating the planned moving path of a vehicle by being superimposed on video data captured by the camera 180. The vehicle moving line generation unit 210 calculates an expected path based on information indicating the steering angle transmitted from the vehicle motion acquisition unit 270, for example. The vehicle moving line generation unit 210 generates the vehicle moving line from the calculated expected path. An arbitrary existing technique may be applied to the generation of the vehicle moving line by the vehicle moving line generation unit 210. For example, the vehicle moving line generation unit 210 calculates one point or two or more points as expected path points. Then, the vehicle moving line generation unit 210 generates information of the vehicle moving line that passes through the expected path points by a predetermined method. An example of the vehicle moving line is line information indicating lines that extend the vehicle width when the vehicle moves in a straight line. Another example of the vehicle moving line is line information associated with the steering angle of the vehicle. The vehicle moving line generation unit 210 transmits information about the generated vehicle moving line to the superimposed video generation unit 150. The vehicle moving line generation unit 210 generates and transmits information about one or a plurality of vehicle moving lines among the above-described vehicle moving lines.

The display control unit 260 receives the superimposed data transmitted from the superimposed video generation unit 150. The display control unit 260 transmits the received superimposed data to the display unit 190. The display control unit 260 may transmit the superimposed data to the display unit 190 or stop transmitting the superimposed data in response to an instruction from a display instruction unit, which is not shown, for example. The display control unit 260 may monitor the vehicle motion acquisition unit 270, and transmit the video data or the superimposed data to the display unit 190 or stop transmitting those data in accordance with information acquired by the vehicle motion acquisition unit 270. Further, the display control unit 260 may connect to the vehicle motion acquisition unit 270 and acquire vehicle motion information.

Figure 9:
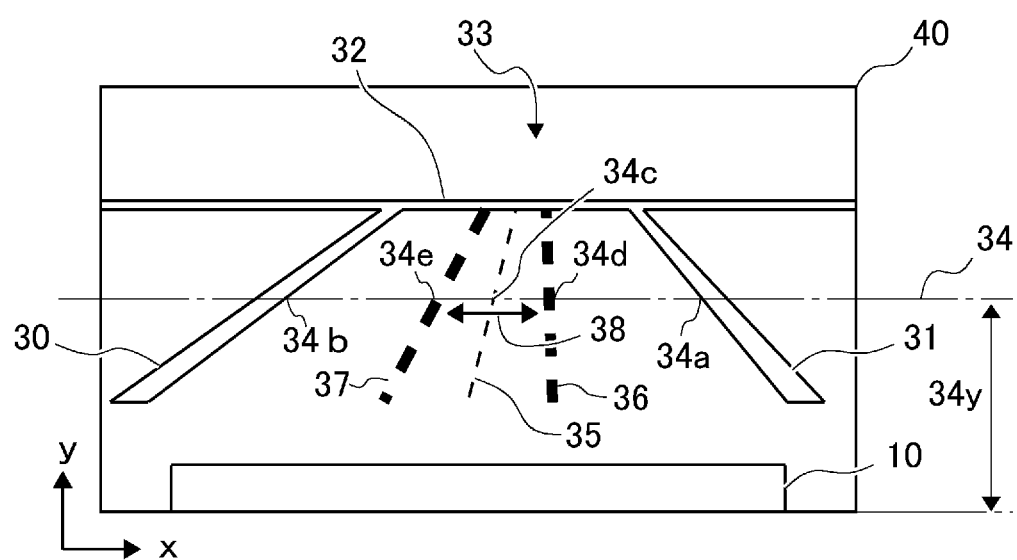
FIG. 9 is a view showing an example of a video image where a center line is superimposed on video data in the display control system 200 according to the second embodiment.

The way of displaying the center line according to the second embodiment is described hereinafter with reference to FIG. 9. FIG. 9 is a view showing an example of a video image where a center line is superimposed on video data in the display control system 200 according to the second embodiment. The video image 40 of FIG. 9 includes a first center limit line 36 and a second center limit line 37 adjacent to the center line 35, in addition to the center line 35.

A specific example of a method of displaying the first center limit line 36 and the second center limit line 37 is described hereinafter. The center line generation unit 140 sets a virtual line 34 that is parallel to the x-axis at a position at a distance 34$y$ from the lower end of the video image 40 in the y-direction. The virtual line 34 is used for the convenience of calculation to generate the center line 35, and it is not necessarily actually displayed on the video image 40. Further, a distance from the vehicle 10 in the video data which coincides with the virtual line 34 is previously set. The position that coincides with the virtual line 34 in the video image 40 of FIG. 9 can be previously set to 3 meters from the rear end of the vehicle 10, for example. Further, the center line generation unit 140 can estimate a distance in the width direction of the video data at such a distance previously set. Specifically, the center line generation unit 140 can estimate a distance between an intersection point 34$b$ and an intersection point 34$a$. The distance between the intersection point 34$b$ and the intersection point 34$a$ is the width of the parking space 33.

The center line generation unit 140 previously stores the width of the vehicle 10. Thus, the center line generation unit 140 can calculate a difference between the width of the parking space 33 and the width of the vehicle 10. The width of the parking space 33 is generally larger than the width of the vehicle 10. Therefore, the difference between the width of the parking space 33 and the width of the vehicle 10 can be regarded as a possible parking range 38 when parking the vehicle 10 in the parking space 33. The center line generation unit 140 divides the calculated possible parking range 38 into two parts. Then, the center line generation unit 140 sets, on the virtual line 34, a first limit point 34$d$ and a second limit point 34$e$, which are points at equal distances from a midpoint 34$c$, which is an intersection point between the center line 35 and the virtual line 34, in the possible parking range 38. Therefore, the distance between the first limit point 34$d$ and the second limit point 34$e$ corresponds to the possible parking range 38 when parking the vehicle 10 in the parking space 33.

The first center limit line 36 can be displayed as a line that passes through the first limit point 34$d$ and that is virtually parallel to the parking line 30, the parking line 31 and the center line 35. Likewise, the second center limit line 37 can be displayed as a line that passes through the second limit point 34$e$ and that is virtually parallel to the parking line 30, the parking line 31 and the center line 35.

A vehicle moving line in the display control system 200 according to the second embodiment is described hereinafter with reference to FIGS. 10A and 10B. In the display control system 200, the vehicle moving line generation unit 110 generates a vehicle moving line that extends along a planned moving path in accordance with the steering angle from a center part along the width of the vehicle 10.

Figure 10A:
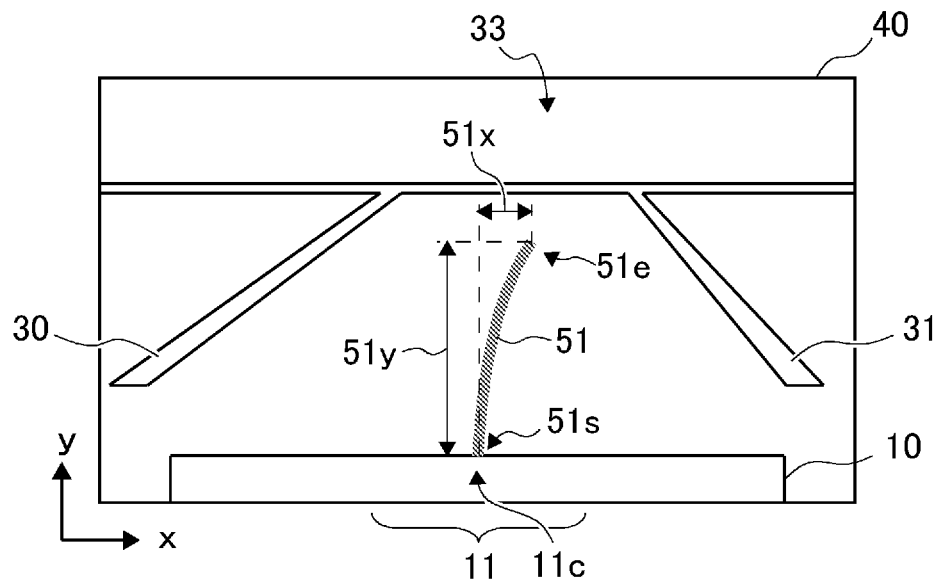
FIG. 10A is a view showing an example of a video image where a vehicle moving line is superimposed on video data in the display control system 200 according to the second embodiment.
Figure 10B:
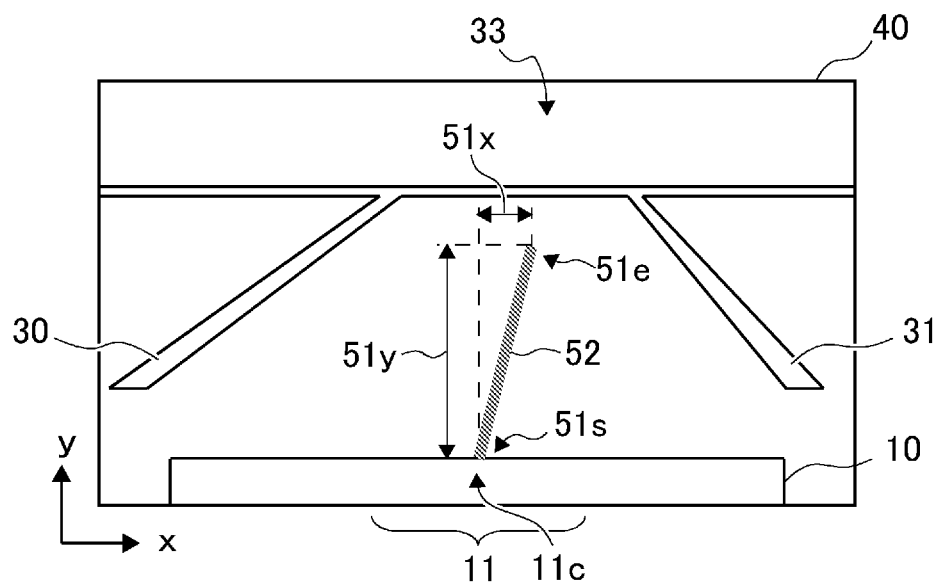
FIG. 10B is a view showing an example of a video image where a vehicle moving line is superimposed on video data in the display control system 200 according to the second embodiment.

FIGS. 10A and 10B are views showing an example of a video image where a vehicle moving line is superimposed on video data in the display control system 200 according to the second embodiment. The video image 40 in FIG. 10A contains a vehicle moving line 51 in addition to the video image described in FIG. 3. The vehicle moving line 51 extends along a planned moving path in accordance with the steering angle from a center part 11 of the width of the vehicle 10. In other words, the vehicle moving line 51 is line information indicating an expected driving path of the vehicle 10 in accordance with the steering angle of the vehicle 10. The vehicle moving line 51 is a curved line in accordance with the steering angle of the vehicle 10 except when the vehicle 10 is moving in a straight line. The curvature of the vehicle moving line 51 is larger as the steering angle of the vehicle 10 is larger.

A vehicle moving line 52 superimposed on the video image 40 shown in FIG. 10B is a straight line. The vehicle moving line 52 extends linearly along a planned moving path in accordance with the steering angle from a start point 51s coinciding with the center part 11 of the vehicle 10. Thus, the vehicle moving line 52 connects the start point 51s and an end point 51e by a straight line. The vehicle moving line 52 draws a straight line parallel to the y-axis when the vehicle 10 is moving in a straight line. The angle between the vehicle moving line 52 and the y-axis is larger as the steering angle of the vehicle 10 is larger.

The start point 51s is contained in the center part 11 of the vehicle 10. The center part 11 is a region that occupies about one-third of the width of the vehicle 10 displayed on the video image 40. The start point 50s may coincide with a center point 11c in the center part 11. The end point 51e is a point on a curved line extending from the start point 51s along the planned moving path in accordance with the steering angle of the vehicle.

The end point 51e may indicate a position where the actual distance from the vehicle 10 corresponds to a predetermined value. In the video image 40, a length 51y in the y-axis direction from the start point 51s to the end point 51e corresponds to a distance of 3 meters, for example, from the center part 11 of the vehicle 10. In this case, the length 51y up to the end point 51e in the y-axis direction can be fixed. Further, the position of the end point 51e in the x-axis direction varies depending on the steering angle of the vehicle 10. As the steering angle of the vehicle 10 is larger, the absolute value of a length 51x in the x-axis direction increases. When the steering direction of the vehicle 10 is right in the video image 40, the vehicle moving line 52 extends from the center part 11 in the y-axis positive direction and the x-axis positive direction. Likewise, when the steering direction of the vehicle 10 is left in the video image 40, the vehicle moving line 52 extends from the center part 11 in the y-axis positive direction and the x-axis negative direction.

Note that, the length 51y up to the end point 51e in the y-axis direction may remain unfixed, and it may change to draw a circle or an ellipse around the start point 51s. The length 51y up to the end point 51e in the y-axis direction may remain unfixed, and it may change in such a way that the length of the vehicle moving line 52 is substantially the same even when the steering angle changes.

The vehicle moving lines 51 and 52 are not necessarily a solid line as shown in FIGS. 10A and 10B, and they may be a dashed line or a dotted line. The vehicle moving lines 51 and 52 are not necessarily equally bold, and their width may vary from the start point 51s to the end point 51e.

Figure 11:
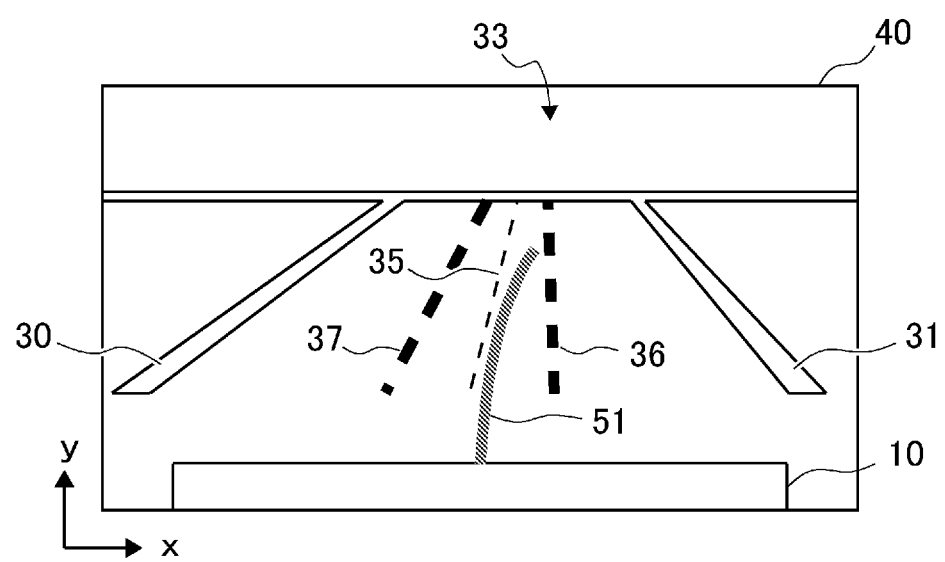
FIG. 11 is a view showing an example of a video image where a vehicle moving line and a center limit line are superimposed on video data in the display control system 200 according to the second embodiment.

An example of a video image on which a center line and a vehicle moving line are superimposed is described hereinafter with reference to FIG. 11. FIG. 11 is a view showing an example of a video image where a vehicle moving line and a center limit line are superimposed on video data in the display control system 200 according to the second embodiment. The video image 40 of FIG. 11 contains a parking space 33, a center line 35, a first center limit line 36, a second center limit line 37 and a vehicle moving line 51.

In FIG. 11, the vehicle 10 is moving toward the parking space 33. In the video image 40 in FIG. 11, the condition that the vehicle moving line 51 is located between the first center limit line 36 and the second center limit line 37 indicates that the vehicle 10 is located between the parking line 30 and the parking line 31. Thus, a user can handle the vehicle with an intention to maintain the vehicle moving line 51 between the first center limit line 36 and the second center limit line 37.

Further, a user can handle the vehicle with an intention to make the vehicle moving line 51 coincide with the center line 35 by controlling a steering wheel. Note that, although FIG. 11 shows an example in which the center line 35 is displayed, the first center limit line 36 and the second center limit line 37 may be displayed without displaying the center line 35.

Figure 12:
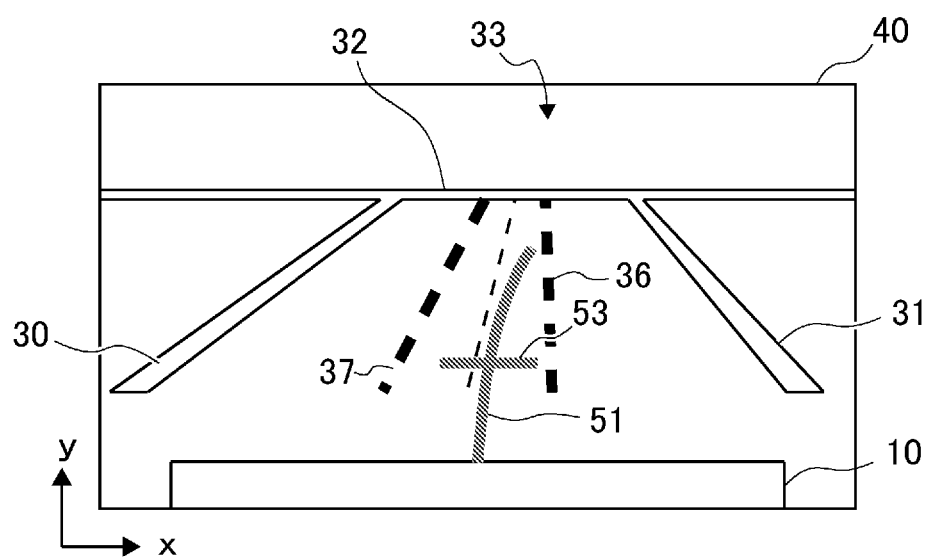
FIG. 12 is a view showing an example of a video image where a distance indicator line is further superimposed on video data in the display control system 200 according to the second embodiment.

Another example of the second embodiment is described hereinafter with reference to FIG. 12. FIG. 12 is a view showing an example of a video image where a distance indicator line is further superimposed on video data in the display control system 200 according to the second embodiment.

The video image 40 in FIG. 12 contains a distance indicator line 53 in addition to the example of the video image 40 in FIG. 11. The distance indicator line 53 is line information extending in the horizontal direction of the video image 40, which is the direction parallel to the x-axis. The distance indicator line 53 indicates a predetermined distance from the end of the vehicle 10. In FIG. 12, the distance indicator line 53 indicates a distance of 0.4 meter from the rear end of the vehicle 10, for example. A user can move the vehicle 10 with an intention to make the distance indicator line 53 coincide with the parking line 32. The distance indicator line 53 may be displayed as a plurality of lines indicating a plurality of distances such as 2 m, 1 m and 0.4 m, for example. With this distance indicator line 53, a user can intuitively recognize the distance between the vehicle 10 and the parking line 32.

Figure 13:
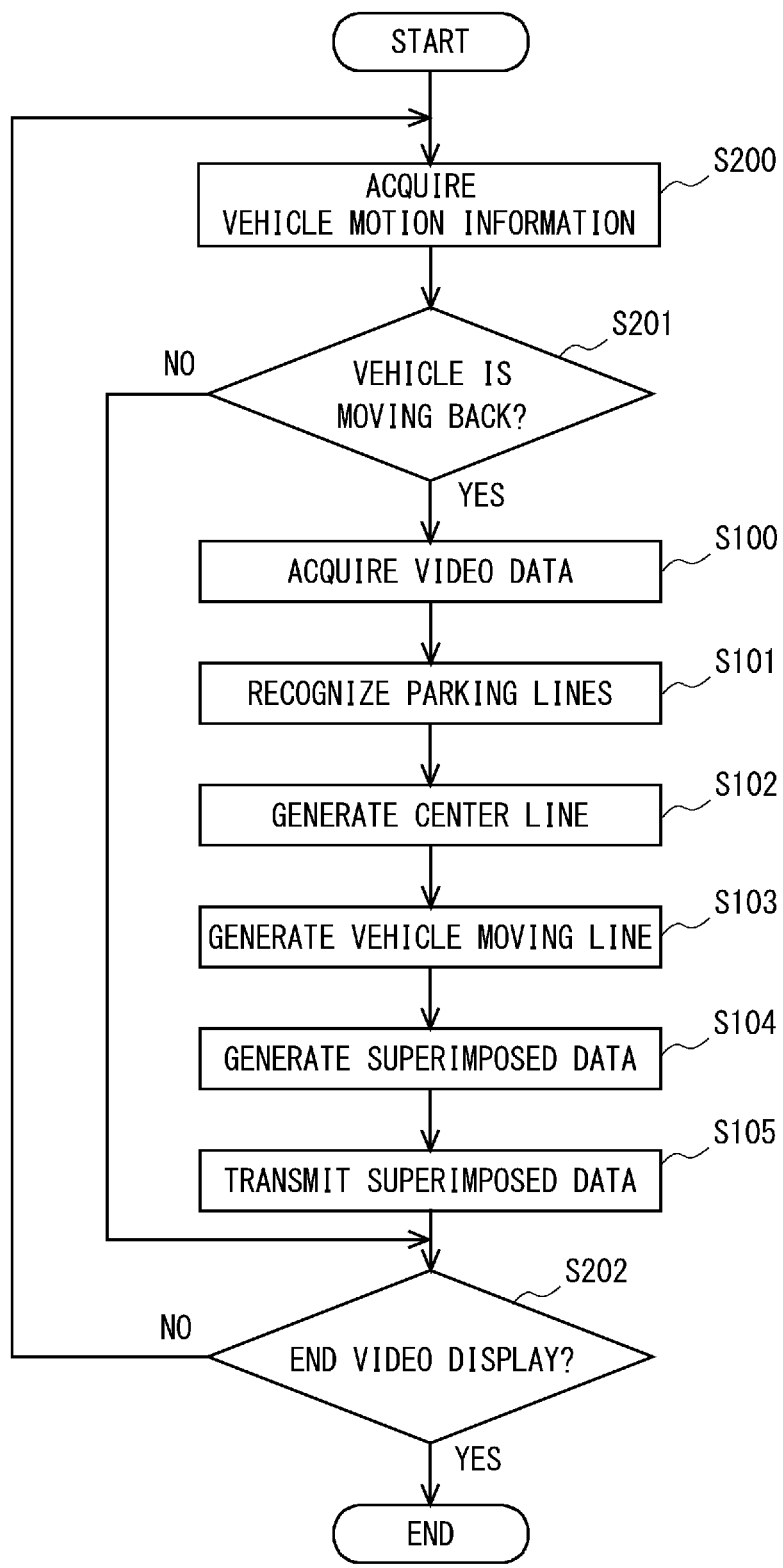
FIG. 13 is a view showing a flowchart in a display control device 201 according to the second embodiment.
Figure 14:
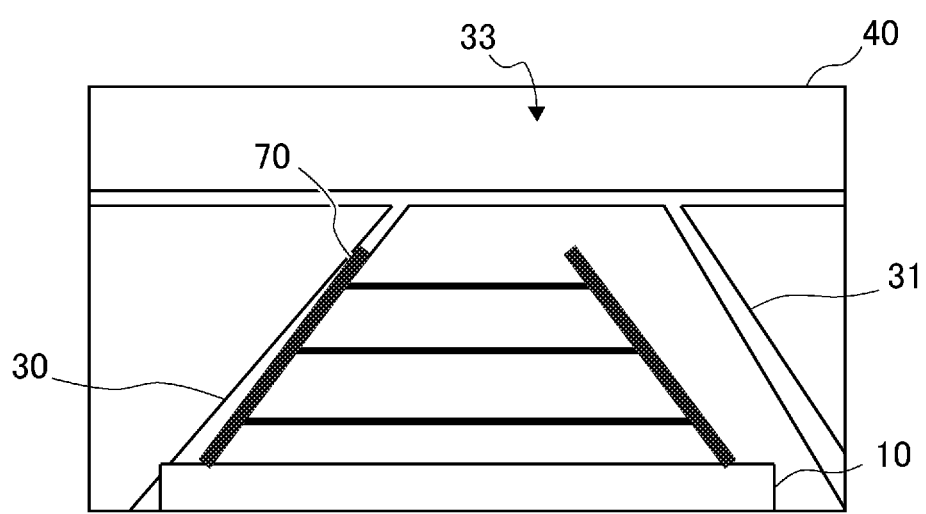
FIG. 14 is a view showing an example of a rearward video in a related art.

A process of the display control device 201 according to the second embodiment is described hereinafter with reference to FIG. 13. FIG. 13 is a view showing a flowchart in the display control device 201 according to the second embodiment. The flowchart in the display control device 201 is the same as the flowchart in the display control device 101 in the processing from Step S100 to S105. Different processing from the flowchart in the display control device 101 is described hereinbelow.

First, the vehicle motion acquisition unit 270 acquires information about the setting of the transmission of the vehicle 10 from a CAN or the like, which is an in-car network (Step S200).

Next, the display control unit 160 acquires the information about the setting of the transmission of the vehicle 10 acquired by the vehicle motion acquisition unit 270, and determines whether the vehicle 10 is to move backward or not (Step S201). When the vehicle 10 is not to move backward, which is, when the setting of the transmission of the vehicle 10 is not a reverse range (No in Step S201), the display control unit 160 determines whether an instruction to end video display is received or not (Step S202). When an instruction to end video display is received (Yes in Step S202), the display control unit 160 ends the process. On the other hand, when an instruction to end video display is not received (No in Step S202), the process returns to Step S200, and the vehicle motion acquisition unit 270 acquires information about the setting of the transmission of the vehicle 10 again.

On the other hand, when the vehicle 10 is moving backward, which is, when the setting of the transmission of the vehicle 10 is a reverse range (Yes in Step S201), the display control unit 160 performs processing of transmitting superimposed data to the display unit 190 (Step S100 to Step S105).

Then, the display unit 160 determines whether an instruction to end video display is received or not (Step S202).

When an instruction to end video display is received (Yes in Step S202), the display control unit 160 ends the process.

On the other hand, when an instruction to end video display is not received (No in Step S202), the display control device 201 returns to Step S200, and the vehicle motion acquisition unit 270 acquires information about the setting of the transmission of the vehicle 10 again.

In this configuration, the display control system 200 according to the second embodiment reduces the possibility that a parking line and a vehicle moving line overlap in the y-axis direction of the video image 40 when a driver moves a vehicle to a parking space. Thus, the display control system 200 according to the second embodiment can reduce difficulty of visually determining a parking line. Further, it is possible to provide the display control system that supports intuitive vehicle handling by intending to maintain the vehicle moving line between the first center limit line 36 and the second center limit line 37. It should be noted that the present invention is not restricted to the above-described embodiments, and various changes and modifications may be made without departing from the scope of the invention. For example, the above-described embodiments may be applied to the case where the vehicle 10 moves forward to the parking space 33. In this case, the display control device 201 can superimpose the vehicle moving line on data of a video captured by the forward camera 180F of the vehicle 10. In this case, in Step S200, the display control device 201 can acquire that the vehicle 10 is moving forward at a speed slower than a predetermined traveling speed, for example. Alternatively, in Step S200, the display control device 201 may start a first display mode in response to an instruction from a driver, which is not shown.

Further, the vehicle moving line 51 or the vehicle moving line 52 described in the second embodiment may be applied to the display control system 100 according to the first embodiment. Furthermore, in the display control system 200 according to the second embodiment, only the center line 35 may be displayed without displaying the first center limit line 36 and the second center limit line 37.

A display control device according to this embodiment can be used to acquire a video around a vehicle in motion, for example.

What is claimed is:

1. A display control device comprising:
    a video data acquisition unit configured to acquire video data from a camera that captures a video in a moving direction of a vehicle;
    a parking line recognition unit configured to recognize a plurality of parking lines being lines of a parking space from the video data, the plurality of recognized parking lines comprising a first recognized parking line, a second recognized parking line, and a parking space width between the first and second recognized parking lines;
    a center line generation unit configured to generate
        (i) a center line of the parking space between the first and second recognized parking lines based on the plurality of recognized parking lines,
        (ii) a first center limit line between the first recognized parking line and the center line, the first center limit line having a first distance from the center line corresponding to a first part of a difference, along the parking space width, between the parking space width and the width of the vehicle registered in advance, and
        (iii) a second center limit line between the second recognized parking line and the center line, the second center limit line having a second distance from the center line corresponding to a remaining part of the difference,
        the difference between the first and second center limit lines corresponding to a possible parking range;
    a vehicle moving line generation unit configured to generate a vehicle moving line extending in the moving direction of the vehicle from a position corresponding to a center part along the width of the vehicle, the vehicle moving line indicating the moving direction of the vehicle;
    a superimposed video generation unit configured to generate superimposed data being video data where the center line and the first and second center limit lines, and the vehicle moving line are superimposed on the video data; and
    a display control unit configured to transmit the superimposed data to a display unit so as to display a video related to the superimposed data on the display unit, wherein the center line and the first and second center limit lines are displayed superimposed between and stationary with respect to the recognized parking lines.

2. A display control device comprising:
    acquiring video data from a camera that captures a video in a moving direction of a vehicle;
    recognizing a plurality of parking lines being lines of a parking space from the video data, the plurality of recognized parking lines comprising a first recognized parking line, a second recognized parking line, and a parking space width between the first and second recognized parking lines;
    generating
        (i) a center line of the parking space between the first and second recognized parking lines based on the plurality of recognized parking lines,
        (ii) a first center limit line between the first recognized parking line and the center line, the first center limit line having a first distance from the center line corresponding to a first part of a difference, along the parking space width, between the parking space width and the width of the vehicle registered in advance, and
        (iii) a second center limit line between the second recognized parking line and the center line, the second center limit line having a second distance from the center line corresponding to a remaining part of the difference,
        the difference between the first and second center limit lines corresponding to a possible parking range;
    generating a vehicle moving line extending in the moving direction of the vehicle from a position corresponding to a center part along the width of the vehicle, the vehicle moving line indicating the moving direction of the vehicle;
    generating superimposed data being video data where the center line and the first and second center limit lines, and the vehicle moving line are superimposed on the video data; and
    transmitting the superimposed data to a display unit so as to display a video related to the superimposed data on the display unit, wherein the center line and the first and second center limit lines are displayed superimposed between and stationary with respect to the recognized parking lines.

3. A non-transitory computer readable medium storing a display control program causing a computer to execute:

acquiring video data from a camera that captures a video in a moving direction of a vehicle;

recognizing a plurality of parking lines being lines of a parking space from the video data, the plurality of recognized parking lines comprising a first recognized parking line, a second recognized parking line, and a parking space width between the first and second recognized parking lines;

generating
(i) a center line of the parking space between the first and second recognized parking lines based on the plurality of recognized parking lines,
(ii) a first center limit line between the first recognized parking line and the center line, the first center limit line having a first distance from the center line corresponding to a first part of a difference, along the parking space width, between the parking space width and the width of the vehicle registered in advance, and
(iii) a second center limit line between the second recognized parking line and the center line, the second center limit line having a second distance from the center line corresponding to a remaining part of the difference, the difference between the first and second center limit lines corresponding to a possible parking range;

generating a vehicle moving line extending in the moving direction of the vehicle from a position corresponding to a center part along the width of the vehicle, the vehicle moving line indicating the moving direction of the vehicle;

generating superimposed data being video data where the center line and the first and second center limit lines, and the vehicle moving line are superimposed on the video data; and transmitting the superimposed data to a display unit so as to display a video related to the superimposed data on the display unit, wherein the center line and the first and second center limit lines are displayed superimposed between and stationary with respect to the recognized parking lines.

4. The display control device of claim 1, wherein the vehicle moving line corresponds to a steering angle of the vehicle.

5. The display control device of claim 1, wherein the center line generation unit configured to estimate a distance in along the parking space width between the plurality of recognized parking lines.

\* \* \* \* \*